(12) United States Patent
Maynard

(10) Patent No.: US 9,033,772 B2
(45) Date of Patent: May 19, 2015

(54) METHOD FOR PRODUCING FROZEN OYSTERS ON THE HALF SHELL

(76) Inventor: Mark Maynard, Melbourne, FL (US)

(*) Notice: Subject to any disclaimer, the term of this patent is extended or adjusted under 35 U.S.C. 154(b) by 881 days.

(21) Appl. No.: 12/536,591

(22) Filed: Aug. 6, 2009

(65) Prior Publication Data

US 2010/0035531 A1 Feb. 11, 2010

Related U.S. Application Data

(60) Provisional application No. 61/086,517, filed on Aug. 6, 2008.

(51) Int. Cl.
*A22C 29/00* (2006.01)
*A22C 29/04* (2006.01)

(52) U.S. Cl.
CPC .............. *A22C 29/04* (2013.01); *A22C 29/046* (2013.01)

(58) Field of Classification Search
CPC ...... A22C 29/00; A22C 29/04; A22C 29/043; A22C 29/046
USPC ...................................... 452/12–15
See application file for complete search history.

(56) References Cited

U.S. PATENT DOCUMENTS

| | | | |
|---|---|---|---|
| 3,037,237 A | 6/1963 | Lapeyre et al. | |
| 3,594,860 A * | 7/1971 | Nelson et al. | 452/14 |
| 3,605,180 A | 9/1971 | Harris et al. | |
| 3,724,031 A * | 4/1973 | Sterling et al. | 452/12 |
| 4,087,265 A * | 5/1978 | Benson | 62/63 |
| 4,236,276 A * | 12/1980 | Van Twuyver et al. | 452/14 |
| 4,312,099 A * | 1/1982 | Cohen | 452/12 |
| 4,992,289 A * | 2/1991 | Kiczek | 426/479 |
| 5,059,151 A | 10/1991 | Kiczek | |
| 5,679,392 A * | 10/1997 | Schegan et al. | 426/412 |
| 5,773,064 A * | 6/1998 | Tesvich et al. | 426/420 |
| 6,086,468 A * | 7/2000 | Yoshida et al. | 452/14 |
| 6,143,343 A | 11/2000 | Wilson | |
| 6,508,699 B1 * | 1/2003 | Santoriello et al. | 452/99 |
| 2001/0046539 A1* | 11/2001 | Turner et al. | 426/404 |
| 2004/0033298 A1* | 2/2004 | Nelson et al. | 426/506 |

FOREIGN PATENT DOCUMENTS

JP 57-202245 * 12/1982

* cited by examiner

*Primary Examiner* — David Parsley
(74) *Attorney, Agent, or Firm* — Timothy H. Van Dyke; Beusse, Wolter, Sanks & Maire, P.A.

(57) ABSTRACT

A method for producing frozen oysters on the half shell, which comprises the steps of freezing live oysters in their shells, so that the oysters hinges will break open; subjecting the frozen oysters to a water treatment to promote disengagement of the oysters' flesh from one thin shell; and percussing the water treated oysters, so that at least one shell will be knocked off.

5 Claims, 5 Drawing Sheets

Salt water spray treatment

FIG. 4

METHOD FOR PRODUCING FROZEN OYSTERS ON THE HALF SHELL

CROSS REFERENCE TO RELATED APPLICATIONS

This application is related to U.S. Provisional Application 61/086,517 filed Aug. 6, 2008 to which priority is claimed under 35 USC 119(e). This application is incorporated herein in its entirety.

FIELD OF THE INVENTION

The present invention relates to oysters, and more particularly, a method for producing frozen oysters on the half shell.

BACKGROUND

Frozen half shell oysters started becoming popular in 2001, 2002. They do not spoil and require no shuckers at restaurants to open. Traditionally, to produce frozen half shell oysters each live oyster must be opened one at a time (shucked) by hand, using many workers with sharp knifes or grinders. This is a very labor intense process, having to use skilled workers and is expensive. Once the oysters are opened on the half shell they are quick frozen using small co2 or nitrogen tunnel freezers. Then they are sold to restaurants and food establishments for easy to eat half shell oysters. The inventors have also identified a problem with conventional frozen oyster processing methods, i.e., that the frozen oysters are often not presentable. The shucking and freezing process causes tears in the oyster flesh and also the oyster sits crooked with respect to the shell. Also, the oysters tend to loose their natural juice in conventional processing methods.

U.S. Pat. No. 3,037,237 issued on Jun. 5, 1963, to Lapeyre et al. teaches in a machine for shucking oysters, a rotary tumbling drum adapted to receive oysters at one end and having veins therein for lifting the oysters and dropping the same at a high portion of the drum incident to its rotation, and an anvil mounted within the drum but non-rotary with respect to the drum and located to receive the impact of the dropped oysters, the anvil composed of two downwardly divergent plates from a central narrow ridge. The inventors have identified that the process in the '151 patent results in damage to the oyster flesh making the oysters unappetizing to the eye of the consumer.

U.S. Pat. No. 3,605,180 issued on Sep. 20, 1971, to Harris et al. teaches an invention that pertains to shucking fresh bivalves and it encompasses both an apparatus and method which removes rapidly, and without damage, the edible portion of the bivalve. The invention consists of removing a portion of the shells of the bivalve (preferably after some of the fluids contained in the bivalve cavity have been eliminated particularly in the case of oysters), thereafter severing muscles of the bivalve which connect the meat to the shells, and finally separating the meat and the shells, and the apparatus for accomplishing the foregoing operation. The invention pertains to bivalves in general but is especially useful in the shucking of oysters and clams.

U.S. Pat. No. 5,059,151 issued on Oct. 22, 1991, to Kiczek teaches a method and apparatus for opening a mollusk (e.g., oyster) by rapidly cooling the mollusk to a surface temperature of about −100.degree. F. followed by mechanically agitating the mollusk whereby the mollusk shell opens and at least one eye of the mollusk meat is detached from the shell. Subsequent to cooling and prior to agitating, the mollusk can be rapidly immersed in a water bath to raise the surface temperature of the mollusk to no more than about −50.degree. F. Individually quick frozen mollusk meat can be prepared rapidly either as an individual portion of meat or on the half shell. The inventors have identified that the process in the '151 patent results in damage to the oyster flesh making the oysters unappetizing to the eye of the consumer.

U.S. Pat. No. 6,143,343 issued on Nov. 7, 2000, to Wilson teaches a process and device for reducing the harmful affects of bacterial contamination in seafood products via freezing the seafood products and maintaining them in cold storage. The process and device features an ice glazing step in which the raw product is sealed in a thin layer of ice. This layer of ice serves to preserve the raw product's original taste during the cold storage.

It is apparent now that different ways of shucking oysters are present in the prior art that are adequate for various purposes. However, the aforementioned references do not disclose the elements of the embodiments of the present invention and fail to contemplate the unique and advantageous aspects of various embodiments of the invention.

SUMMARY OF THE INVENTION

One embodiment of the present invention provides a method for producing frozen oysters on the half shell that is simple to implement.

Another embodiment of the present invention provides a method for producing frozen oysters on the half shell, which includes the steps of freezing live oysters in their shells, so that the oysters hinges will break open; subjecting one shell, or both shells of the frozen oysters to a water treatment, so as to promote disengagement of the oyster's flesh from their thin shells; and percussing the water treated oysters, so that at least one of their shells will be knocked off. In a more specific embodiment, one side of the oyster is predominantly treated with water and it is this predominantly treated shell that knocks off by percussion.

According to another embodiment, the invention pertains to a system that comprises a cryogenic freezing apparatus for freezing oysters to an appropriate temperature in order to crack the hinge of the oyster, a water tunnel that subjects the oysters to a water treatment (spray or shower) predominantly on one side of the oyster at a predetermined time; and an inclined percussing apparatus. Oysters are delivered to and dropped onto the inclined percussing apparatus which causes the oyster shell given the water treatment to knock off the oyster. In a specific embodiment, the freezing apparatus freezes the oysters by subjecting them to a gas at −120 degrees F. below zero. The system also comprises a water tunnel in which the oysters, once frozen, are subjected to a spray of water. In a more specific embodiment, the oysters are turned flat side up, and then subjected to a water spray that contacts the flat side of the oyster for a predetermined amount of time. A conveyor carries the oysters from the freezing apparatus to the water tunnel. The system also includes an inclined percussing apparatus. The inclined apparatus may be inclined at an angle of between 10 degrees to 80 degrees and all integers in between, respective to the horizontal axis. In a specific embodiment, the angle is between 20 and 60 degrees and all integers in between. In a more specific embodiment, the angle is between 30 and 50 degrees or between 35 and 45 degrees, and all integers in between. In a precise embodiment, the incline angle is 40 degrees. A conveyor carries the oysters out of the tunnel and to a precipice where the oysters are dropped onto the inclined apparatus. The percussion of the shell onto the inclined apparatus causes the flat shell side of the oyster to knock off leaving intact and well-shaped frozen oyster meat remaining on the round shell side of the oyster. The system also comprises a glazing tunnel that sprays the oyster meat with a salt solution which then immediately freezes onto the oyster meat. The salt solution glaze preserves the oyster meat.

The integrity of the oyster flesh achieved by the methods and systems described herein is exceptionally high. The oyster flesh maintains the geometrical shape it possessed immediately prior to removal of one of its shells. In one embodiment, the flesh of the shucked oyster, retains 80, 81, 82, 83, 84, 85, 86, 87, 88, 89, 90, 91, 92, 93, 94, 95, 96, 97, 98, 99, or 100 percent of the geometrical shape of the oyster flesh possessed immediately prior to removal of the one shell.

The novel features which are considered characteristics of certain embodiments of the present invention are set forth in the appended claims. Embodiments of the invention relating to construction and method of operation embodiments, together with additional advantages thereof, will be best understood from the following description of the specific embodiments when read and understood in connection with the accompanying drawings.

BRIEF DESCRIPTION OF THE DRAWINGS

The figures of the drawings are briefly described as follows:

FIG. 4 is a diagrammatic elevational view taken in the direction of arrow 5 in FIG. 2 of a portion thereof.

REFERENCE NUMERALS UTILIZED IN THE DRAWINGS

Detailed Description

Figure 1:
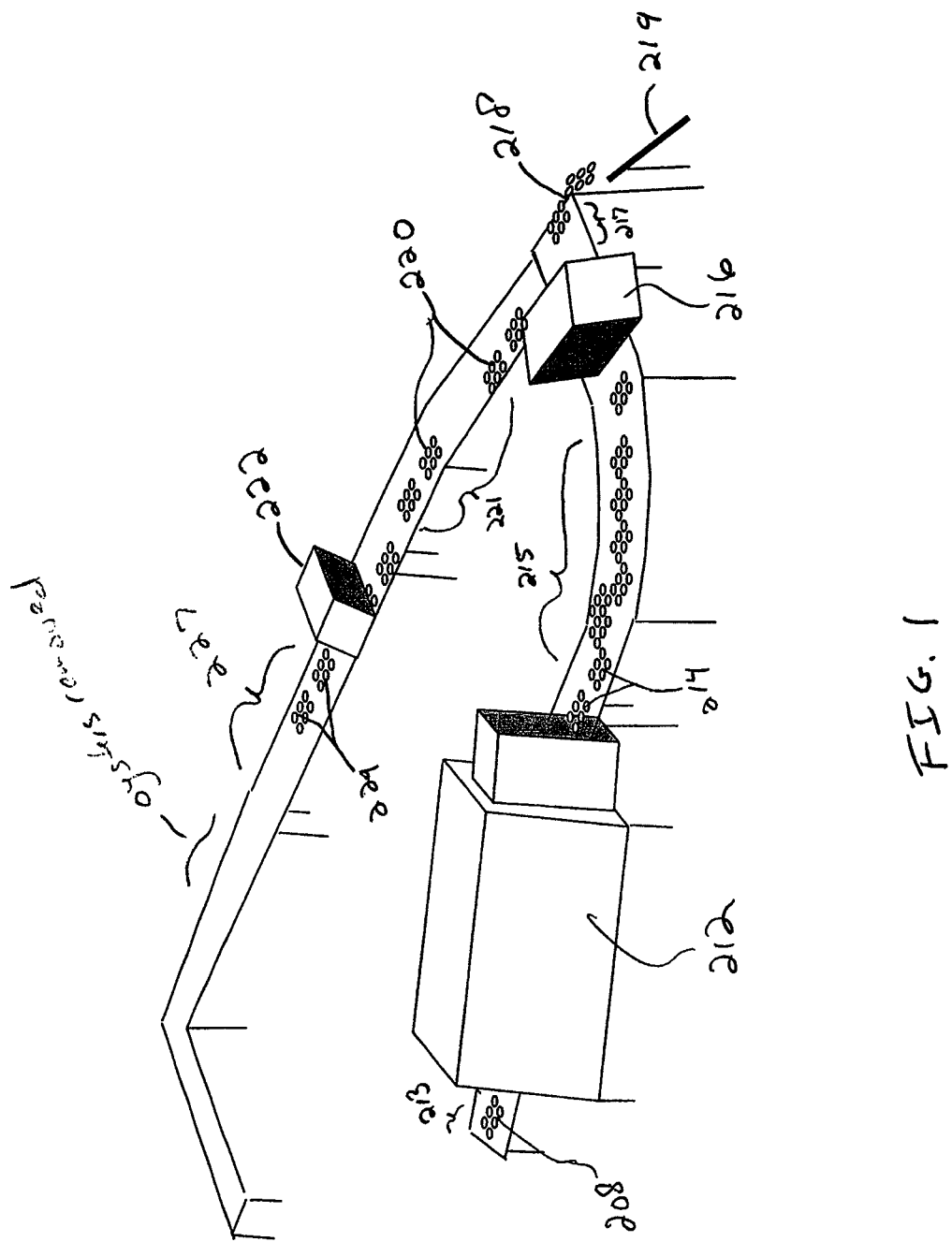
FIG. 1 is a diagrammatic perspective view showing the various steps of the present invention.
Figure 2:
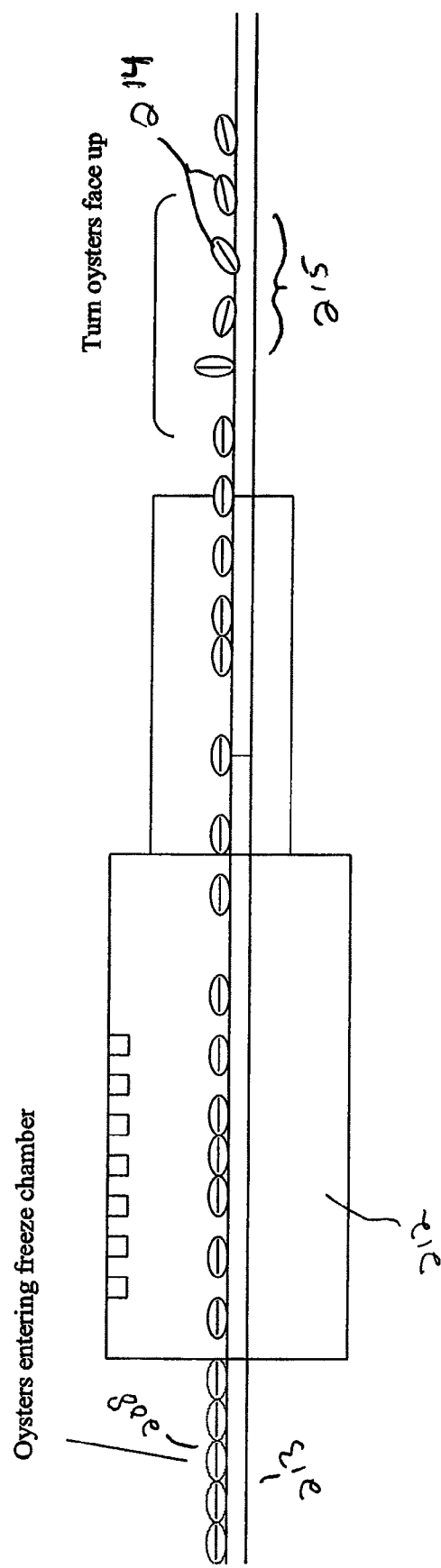
FIG. 2 is a diagrammatic elevational view taken in the direction of arrow 3 in FIG. 2 of a portion thereof.

Referring now to the figures, in which like numerals indicate like parts, and particularly to FIGS. 1 through 5, which are a diagrammatic representation of a flowchart of an embodiment of the present invention; a diagrammatic view showing the complete structure of the present invention; a diagrammatic elevational view taken in the direction of arrow 3 in FIG. 2 of a portion thereof; a diagrammatic elevational view taken in the direction of arrow 4 in FIG. 2 of a portion thereof; and a diagrammatic elevational view taken in the direction of arrow 5 in FIG. 2 of a portion thereof, and as such, will be discussed with reference thereto.

Turning first to FIG. 1, a system embodiment is shown that comprises a cryogenic freezing apparatus 212 for freezing oysters 208 to an appropriate temperature in order to crack the hinge of the oyster. Oysters are loaded onto a first portion of a conveyor 213 which carries fresh live oysters 208 into the freezing apparatus 212. Frozen oysters 214 are transported out of the freezing apparatus 212 via a conveyor second portion 215. The second portion 215 is accessible thereby allowing users to turn the oysters flat side up. Alternatively, the oysters are turned flat side up before entering the freezing apparatus 212. The frozen oysters 214 are transported to a water tunnel 216 that subjects the oysters to a water treatment (spray or shower) predominantly on one side of the oyster at a predetermined time. In an alternative embodiment, the water treatment is substituted by another form of thermal treatment such as heated gas (e.g. heated air) or an oven (e.g. oven having a heating element or some other means of dispensing localized heat). A third conveyor portion 217 transports the frozen oysters 214 from the water tunnel 216 to a precipice 218. The frozen oysters 214 are dropped over the precipice 218 and dropped onto an inclined percussing apparatus 219. Dropping onto the inclined percussing apparatus 219 causes the oyster shell given the water treatment (e.g. flat shell) to knock off. The opened, frozen oysters 220 are delivered to a fourth conveyor portion 221 whereby personnel turn them with the meat facing up. The opened, frozen oysters are transported to a glazing tunnel 222 which showers the oysters with a salt solution. Because the oysters are still at extremely cold temperatures, the salt solution freezes over the opened, frozen oysters 220 thereby creating a protective glaze. A fifth conveyor portion 227 transports glazed oysters 229 from the glazing tunnel 222 to a removing area.

FIG. 2 shows a side view of the first conveyor portion 213 with fresh oysters 208 thereon, the freezing apparatus 212 and second conveyor portion 215. The frozen oysters 214 are turned flat side up before entering the water tunnel as shown in FIG. 3.

Figure 3:
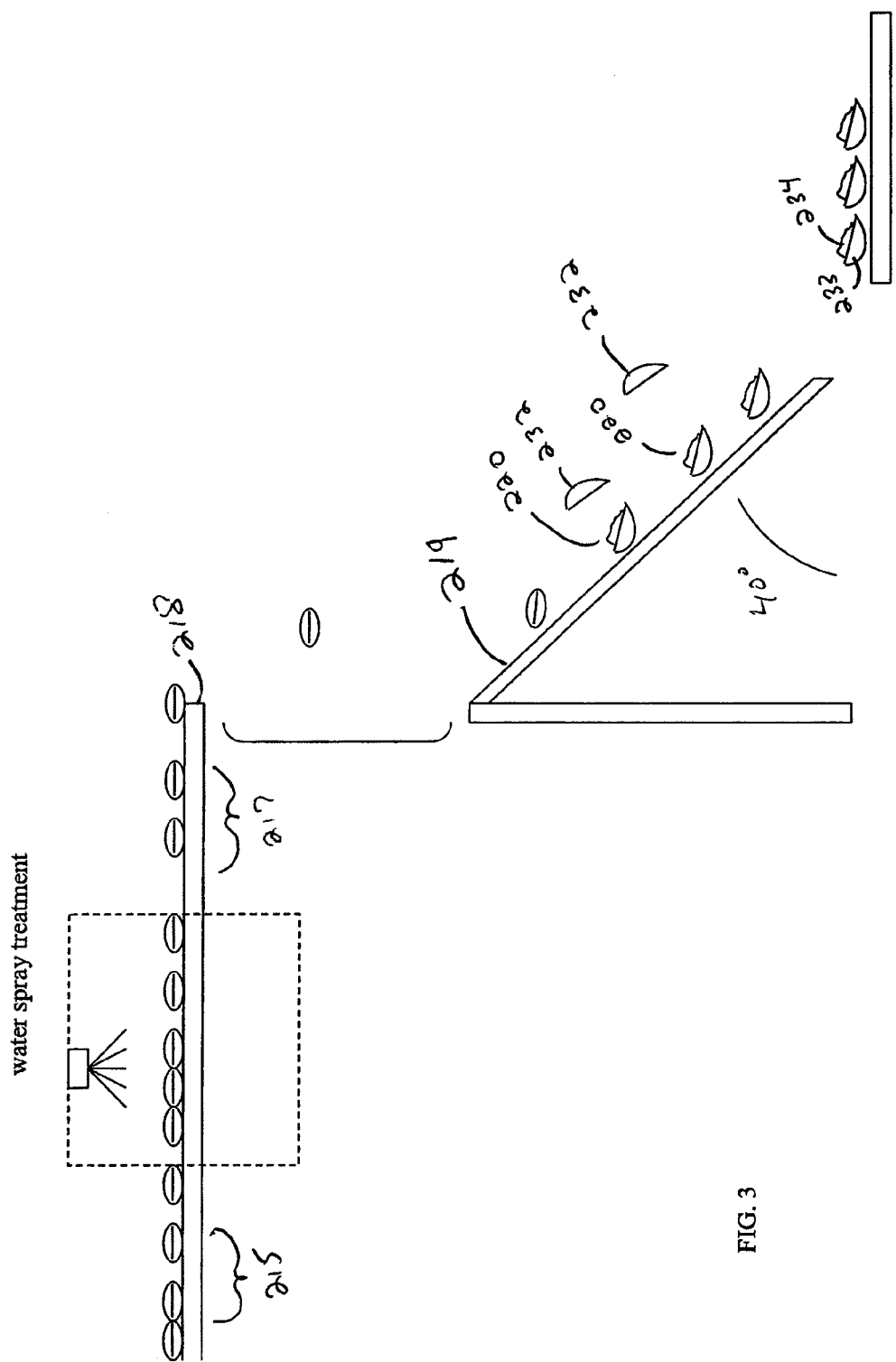
FIG. 3 is a diagrammatic elevational view taken in the direction of arrow 4 in FIG. 2 of a portion thereof.

FIG. 3 shows a side view of the second conveyor portion 215, the water tunnel 216, the third conveyor portion 217, the precipice 218 and the inclined percussing apparatus 219. The frozen oysters 214 are treated with water via spray nozzle 231. The third conveyor portion 217 transports the oysters from the water tunnel 216 to precipice 218 whereby the oysters fall onto the inclined percussing apparatus 219 causing the flat shell 232 to knock off from the round shell 233 and oyster meat 234. The round shell and oyster meat provide open, frozen oysters 220.

Figure 4:
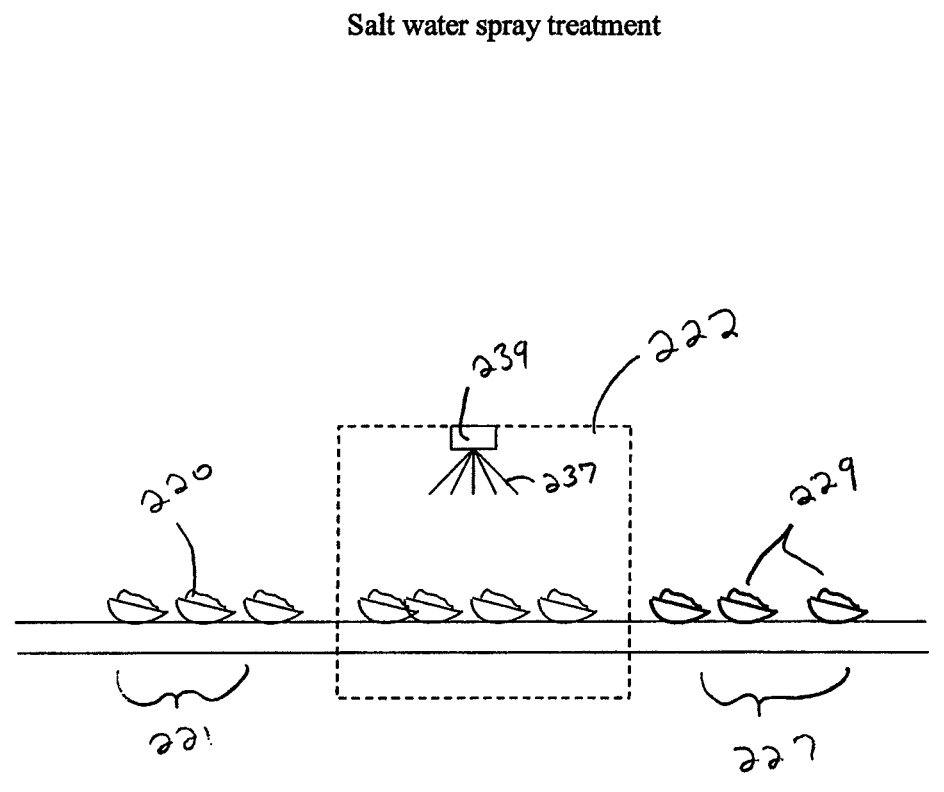

FIG. 4 shows a side view of the fourth conveyor portion 221, glazing tunnel 222 and fifth conveyor portion 227. The opened frozen oysters 220 are transported to the glazing tunnel 222 and subjected to a salt solution 237 via spray nozzle 239. The salt solution 237 freezes over the opened frozen oysters 220 to form glazed oysters 229.

Figure 5:
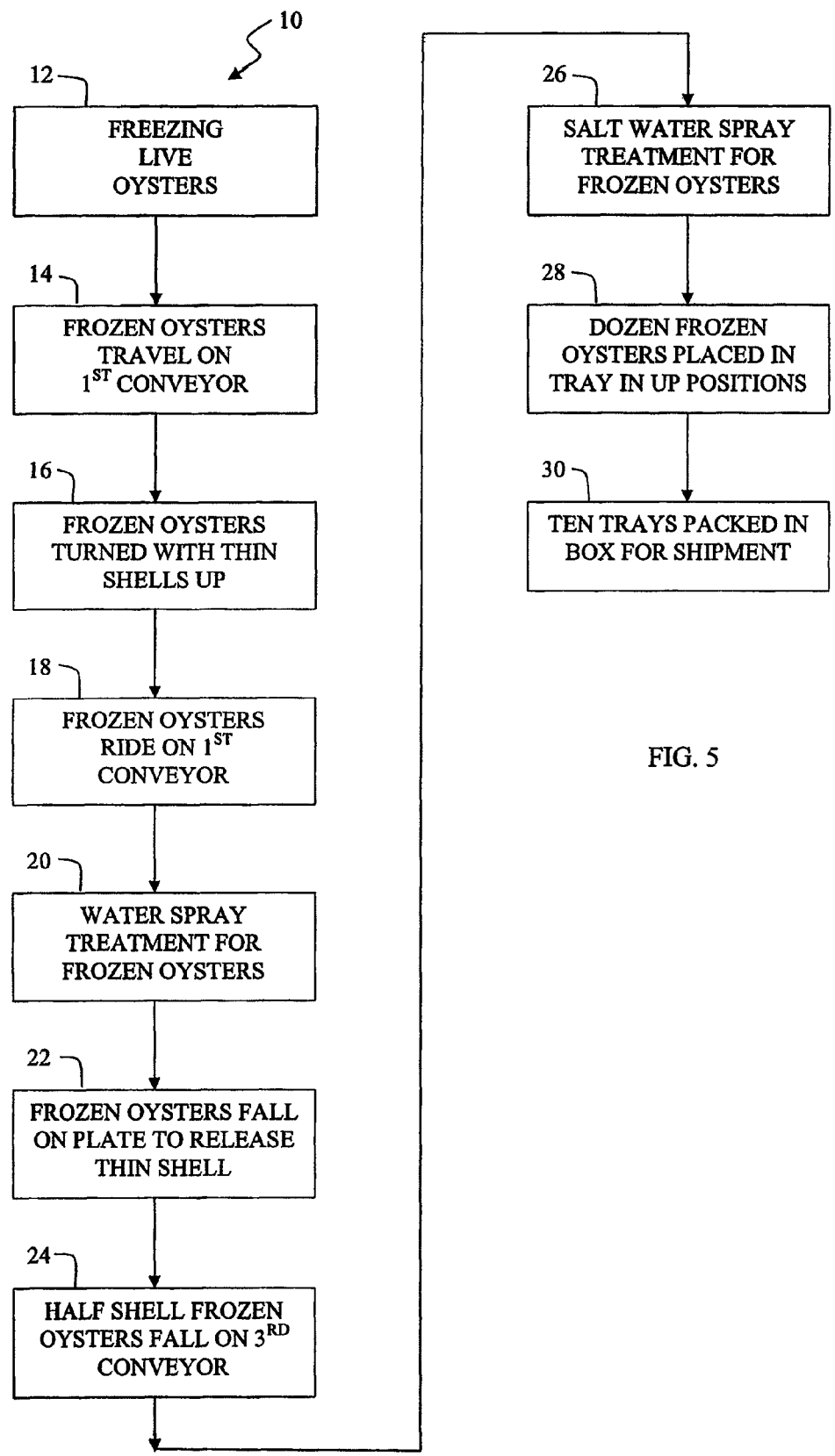
FIG. 5 is a diagrammatic representation of a flowchart of an embodiment of the present invention.

Turning to FIG. 5, a flowchart of a method embodiment 10 for producing frozen oysters on the half shell is shown.

In a first step 12 live oysters in the shell, (not opened, not shucked) are placed in a nitrogen tunnel freezer where liquid nitrogen is released through a series of manifolds and then jet sprays. The liquid nitrogen is −320 degrees below zero as a liquid. When the liquid nitrogen is released in the tunnel it turns into a super cold gas and causes the oysters to become frozen.

The live oysters in the shells travel on a first conveyor at a speed of 3.15 feet per minute at a temperature of −120 degrees below zero. Total time in the tunnel is 5.54 minutes. In this first step the oysters become completely frozen and pressure from water expansion in the shells causes the hinges in the back of the oysters to break open.

Failure test in step one. Live oysters placed in the same tunnel at −100 degrees below zero for the same time will not cause the hinges in the back of the oysters to break. Many tests with many different temperatures and times have resulted in failure. In addition, live oysters that travel at the same speed at −150 degrees will cause the hinges to break open, but the meat once thawed is so completely damaged it is un-salable.

In a second step 14 the oysters exit the tunnel with an outside shell temperature of −60 to −80 degrees as they move onto a second conveyor. Alternatively, the oysters are put in a freezer for a period of time to allow oysters to acclimate at a desired temperature. In a specific embodiment, the oysters are put in a freezer (typically at −4 to 4 degrees, or normally a zero degree freezer) for 12-48 hours. The inventor has found that the oyster meat tends to break apart if not enough acclimation time is provided.

In a third step 16, after acclimation, oysters are placed on a conveyor and are turned facing in an up position. The up position is the thin side of the oyster up and the cup side of the oyster down.

In a fourth step 18 the oysters ride on the second conveyor with the shells turned up.

In a fifth step 20 the oysters now frozen in their original shells and all near 0 degrees and facing up enter into a water tunnel that sprays the top shells with water. The temperature of the water is 65 to 70 degrees. The oysters remain in this tunnel for 1 minute 15 seconds to 1 minute 20 seconds depending on the size of the oysters being produced. The inventor has found that too little time in the water tunnel will result in a failure of the top shells to come off, with broken oyster meats. Too long will cause thawed not frozen half shell oysters.

In a sixth step 22 the oysters exit the water tunnel an immediately fall from the second conveyor for a distance of 5 feet onto a stainless steel plate that is ⅜ of an inch thick and setting at an angle of 40 degrees. In this step, one of the two abductor muscles that holds the shells on will fail and release one shell from the oysters. Thermal shock has occurred in this step. Only one of two shells will release leaving perfect frozen half shell oysters.

In a seventh step 24 the oysters will fall onto a third conveyor that will bring them up to table level. The oysters continue to travel at this level and are turned up by hand so that the oysters with meat and one shell are exposed.

In an eighth step 26 the frozen oysters on the half shell pass through another water tunnel where they are sprayed with a 32 degree light water spray containing 1-50 parts per thousand salt. The temperature of the oyster meat is 15 to 20 degrees allowing the water to freeze on the top meat. This allows a frozen water glaze to protect the meat from freezer burn and at the same time adding a flavor of salt. Salt flavor in half shell oysters is the most desired taste.

In a ninth step 28 the oysters travel down the third conveyor. The oysters with meat and one shell exposed are taken from the third conveyor and placed in special plastic shaped trays that hold one dozen in the up position. The empty shells continue on and exit the building to a waste area.

In a tenth step 30 the frozen half shell oysters in one dozen trays with the shells off and water glaze salt are packaged in a box that holds 10 dozen for shipment to restaurants around the country.

It is apparent in view of the teachings herein that an embodiment of the invention is particularly useful for producing frozen oysters on the half shell.

It will be understood that each of the steps described above, or two or more together, may also find a useful application in other types of constructions differing from the types described above.

While the invention has been illustrated and described as an embodiment of a method for producing oysters on the half shell, accordingly it is not limited to the details shown, since it will be understood that various omissions, modifications, substitutions and changes in the forms and details the device illustrated and its operation can be made by those skilled in the art without departing in any way from the sprint of the present invention. The teachings of all of the references cited herein are incorporated by reference to the extent not inconsistent with the teachings herein.

The invention claimed is:

1. A method for producing frozen oysters on the half shell, which comprises the steps of:
   freezing live oysters in their shells to produce frozen oysters, wherein the frozen oysters are unhinged, wherein freezing comprises subjecting the live oysters to nitrogen gas;
   after the freezing step, acclimating oysters to −4 to +4 degrees Fahrenheit;
   after the acclimating step, subjecting the frozen oysters to a thermal shock treatment, said thermal shock treatment being a water shower that is applied predominantly on one shell of the oysters to produce thermal treated oysters, wherein said thermal shock treatment promotes disengagement of a portion of flesh of the oysters from said one shell of the oysters; and
   percussing the thermal treated oysters, so that said one shell of the frozen oysters will be knocked off, thereby producing opened, frozen oysters engaged on one shell.

2. The method of claim 1, wherein percussing the thermal treated oysters comprises dropping the thermal treated oysters onto an inclined apparatus.

3. The method of claim 2, wherein the inclined apparatus comprises a metal impact surface.

4. The method of claim 1, wherein said opened, frozen oysters are subjected to a glazing treatment.

5. The method of claim 1, wherein said acclimating comprises acclimating the frozen oysters to about 0 degrees Fahrenheit.

* * * * *